United States Patent [19]

Aoki et al.

[11] Patent Number: 5,119,271
[45] Date of Patent: Jun. 2, 1992

[54] PROJECTION-TYPE TELEVISION SET

[75] Inventors: Satoshi Aoki, Kadoma; Katsumi Goto, Takatsuki, both of Japan

[73] Assignee: Matsushita Electric Industrial Co., Ltd., Kadoma, Japan

[21] Appl. No.: 721,777

[22] Filed: Jun. 28, 1991

[30] Foreign Application Priority Data

Jun. 29, 1990 [JP] Japan ................... 2-173422

[51] Int. Cl.5 ............................... H04N 5/64
[52] U.S. Cl. ........................ 361/390; 174/66; 248/27.3; 220/3.6; 312/242; 358/254; 361/380

[58] Field of Search ............... 312/20, 333, 223, 242; 248/27.3; 220/3.2, 3.6, 3.5, 3.92, 3.94, 241, 242; 455/345–348; 358/254; 174/53, 57, 66, 67; 361/331, 380, 390–392, 395, 420, 417, 419, 422–424, 427, 429

[56] References Cited

U.S. PATENT DOCUMENTS

| 4,599,485 | 7/1986 | Smolik | 174/57 |
| 4,613,728 | 9/1986 | Lathrop | 174/53 |
| 4,947,457 | 8/1990 | Shin | 455/346 |
| 4,979,909 | 12/1990 | Andrews | 439/352 |

Primary Examiner—Gerald P. Tolin
Attorney, Agent, or Firm—Cushman, Darby & Cushman

[57] ABSTRACT

In a projection-type television set, a screen (2) is provided in front opening part of a housing (1) and held by couplings of frames (30,31) and leaf springs (40,41) provided on ceiling (1a), bottom (1b) and side walls (1c) of the housing (1).

2 Claims, 7 Drawing Sheets

PROJECTION-TYPE TELEVISION SET

BACKGROUND OF THE INVENTION

1. Field of the Invention

The present invention relates to a projection-type television set, and especially relates to an assembly for mounting a screen to which pictual image is projected from a projector provided inside the housing of the television set.

2. Description of the Prior Art

In a conventional projection-type television set, a screen 2 is provided on a housing 1 by processes shown in FIG. 6. At first, the screen 2 is put on a front offset part 1a of the housing 1. Periphery of a front face 2a of the screen 2 is held by frames 3. The frames 3 are fixed on the housing 1 by screws 4. As a result, the screen 2 is fixed on the housing 1. The screen 2 is taken away from the housing 1 by a process oppsite to the above-mentioned processes.

In another conventional projection-type television set, the screen 2 is held between a front end of the housing 1 and the frame 3 as shown in FIG. 7. and the frame 3 is fixed on the housing 1 by, for example, the screws 4.

In the above-mentioned conventional projection-type television set, many screws 4 are necessary for providing the screen 2 on the housing 1 and thereby a great deal of work is necessary for mounting or removing the screen 2.

Furthermore, in the conventional type, it is difficult to provide (or to take) the screen 2 on (or from) the housing 1 when plural projection-type television sets are piled up in multiple-stage, because of difficulty of unscrewing the screws 4.

SUMMARY OF THE INVENTION

Purpose of the invention is to solve the above-mentioned problems and to provide an improved projection-type television set in which a screen can easily and accurately be mounted on or taken away from a housing even when plural housings are piled up in multiple-stage.

A projection-type television set in accordance with the present invention comprises:

a housing in which plurality of projection lenses and CRT displays are provided;

plurality of first leaf springs provided on a front part of respective of a ceiling and a bottom of the housing, and respectively having a notch;

plurality of second leaf springs provided on a front part of respective of side walls of the housing;

a screen provided in a front opening of the housing;

a pair of horizontal frame respectively having an offset part which is held between the ceiling or bottom of the housing and the first leaf springs, having plurality of protrusions which are to be fit in the notches of the first leaf springs and having a groove in which a top end part or a bottom end part of the screen is movably fit; and a pair of vertical frames provided in gaps between the screen and the side walls of the housing and held between the second leaf springs and the side walls.

In the above-mentioned projection-type television set in accordance with the present invention, the screen is detachably provided on the housing by couplings of the frames and the leaf springs, so that the screen is easily mounted on or taken away from the housing even when plurality of the projection-type television sets are piled up.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DESCRIPTION OF PREFERRED EMBODIMENT

A preferred embodiment of a projection-type television set in accordance with the present invention is described referring to FIGS. 1, 2, 3 and 4(a) to 4(d).

Figure 1:
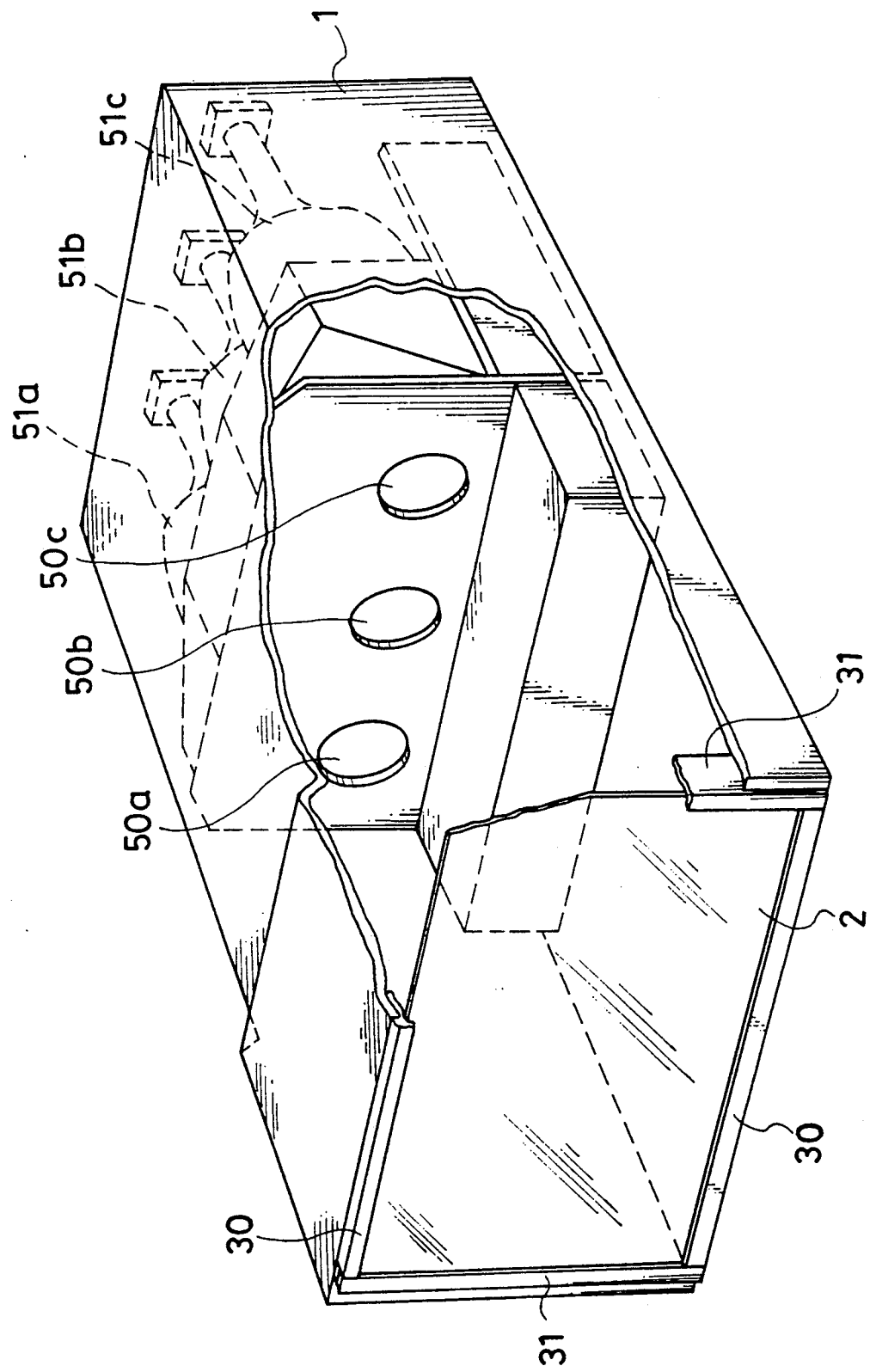
FIG. 1 is a perspective view showing a detailed constitution of a preferred embodiment of the projection-type television set in accordance with the present invention.
Figure 2:
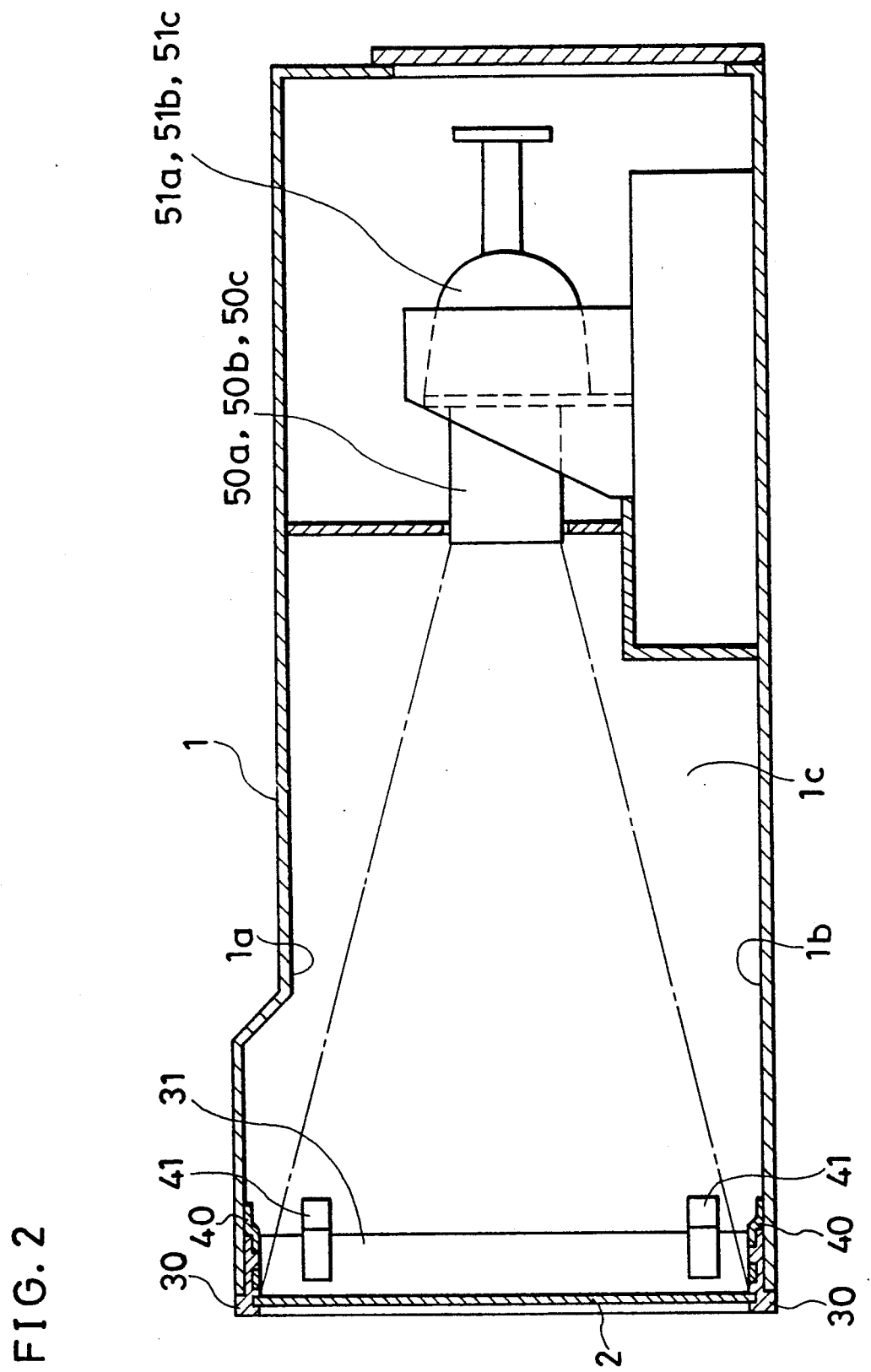
FIG. 2 is a cross-sectional side view showing the constitution of the embodiment shown in FIG. 1.
Figure 3:
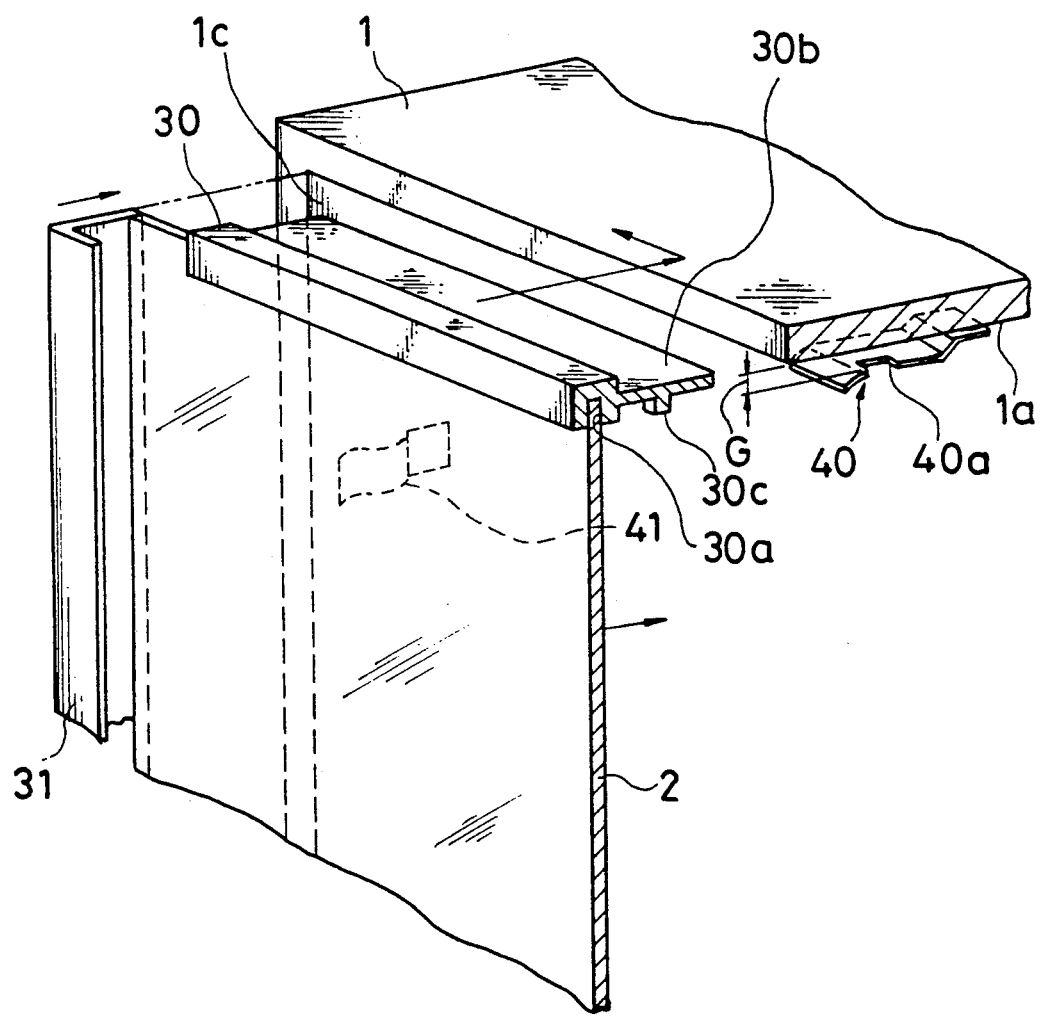
FIG. 3 is a perspective view showing a partial constitution of the embodiment shown in FIG. 1.

FIG. 1 is a perspective view showing the constitution of the projection-type television set in accordance with the present invention. FIG. 2 is a cross-sectional side view showing a constitution of the projection-type television set shown in FIG. 1. FIG. 3 is a perspective view showing a partially enlarged screen part of the projection-type television set shown in FIGS. 1 and 2. FIGS. 4(a) to 4(d) are respectively partial cross-sectional plan views showing assemble processes of a screen on a housing of the projection-type television set in accordance with the present invention.

In FIGS. 1 and 2, the projection-type television set in accordance with the present invention comprises: a housing 1; plural, for example, three sets of projection lenses 50a, 50b, 50c and CRT displays 51a, 51b, 51c; and a screen 2. The screen 2 is fixed on a front opening of the housing 1 by horizontal and vertical frames 30 and 31. In FIG. 2, plurality of first leaf springs 40 are provided on a ceiling 1a and a bottom 1b of the housing 1. And plurality of second leaf springs 41 are provided on side wall(s) 1c of the housing 1.

FIG. 3 shows a partial constitution of the projection-type television set shown in FIG. 1. In FIG. 3, an upper end 2a of the screen 2 fits in a groove 30a of the horizontal frame 30, movably. And an offset part 30b of the horizontal frame 30 fits in a gap G between the ceiling 1a of the housing 1 and the first leaf spring 40. Protrusion 30c of the horizontal frame 30 is to be fit in a notch 40a of the first leaf spring 40. Tolerance between the notch 40a and the protrusion 30c is about 0.2 mm, but shown emphasized in the figures.

Figure 4A:
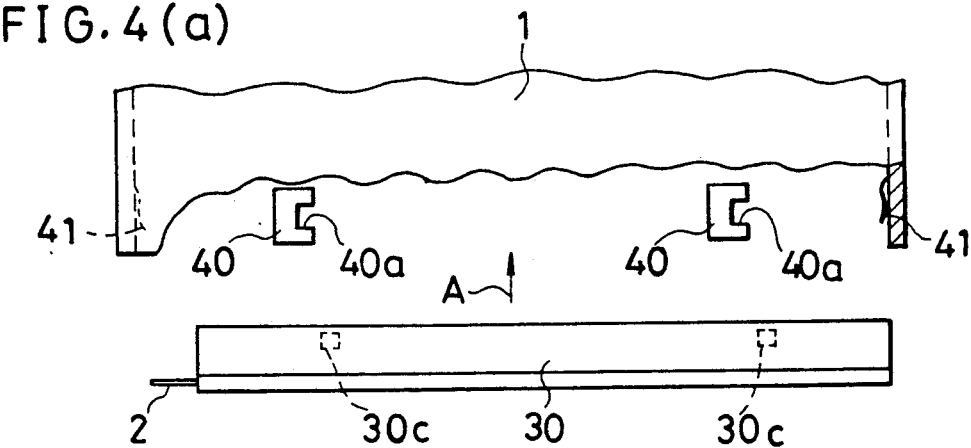
FIGS. 4(a), 4(b), 4(c) and 4(d) are respectively partial cross-sectional plan views showing assembling of a screen on a housing in the embodiment shown in FIG. 1.
Figure 4B:
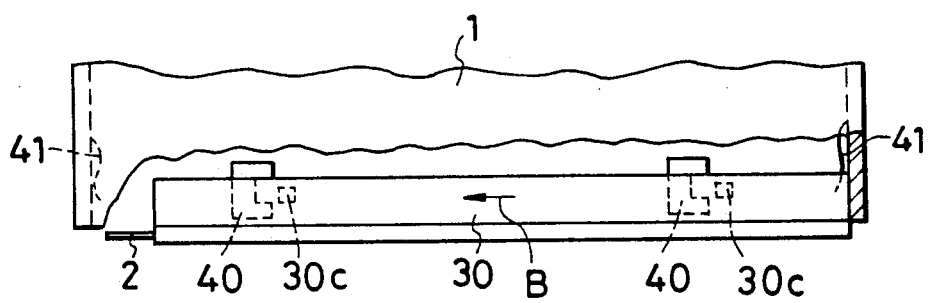

Assembly processes of the screen 2 on the housing 1 are described referring to FIGS. 4(a) to 4(b).

First, the horizontal frame 30 is put aside (right hand in FIG. 4(a)) with respect to the screen 2 as shown in FIG. 4(a). Then, the screen 2 is put in the front opening of the housing 1 together with the horizontal frame 30 as shown in the direction of arrow A in FIG. 4(a).

Second, the horizontal frame 30 is moved on the screen 2 in left-hand shown by arrow B in FIG. 4(b). The movement of the horizontal frame 30 is stopped when the protrusions 30c of the frame 30 are fit in the notches 40a of the first leaf springs 40 as shown in FIG. 4(c).

Figure 4C:
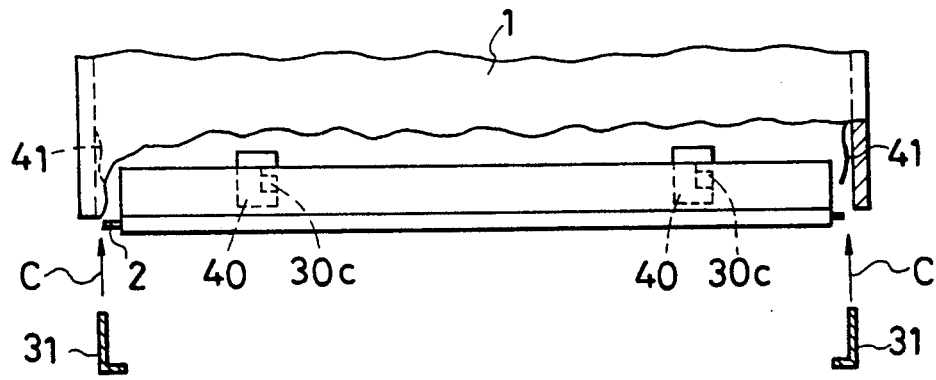
Figure 4D:
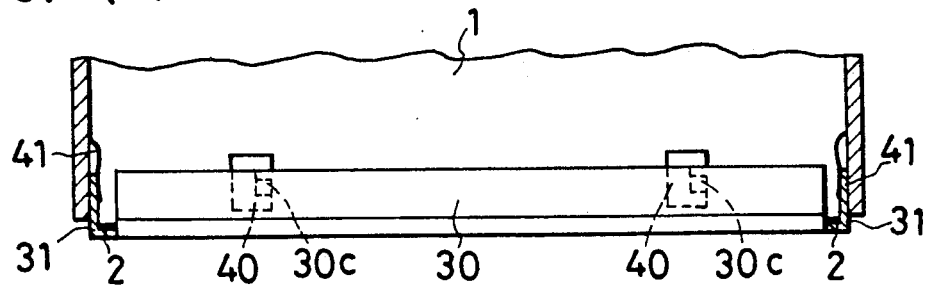

Third, the vertical frames 31 are put in the gaps between the screen 2 and the side walls 1c of the housing 1 shown by arrow C in FIG. 4(c). The vertical frames 31 are held on the side walls 1c by the second leaf springs 41. The lateral movements of the screen 2 and the horizontal frames 30 are prohibited by the existence of the vertical frames 31. As a result, the screen 2 is firmly fixed to the housing 1.

For taking the screen 2 away from the housing 1, processes opposite to that which are mentioned above are executed.

Figure 5A:
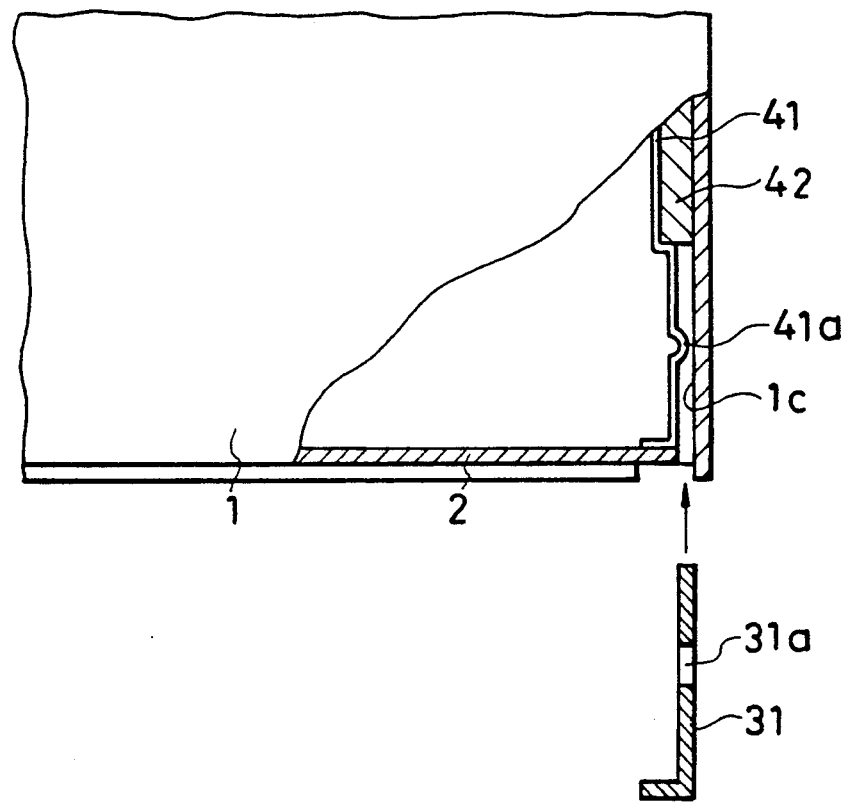
FIGS. 5(a) and 5(b) are partially sectional plan views showing another preferred embodiment of a projection-type television set in accordance with the present invention.
Figure 5B:
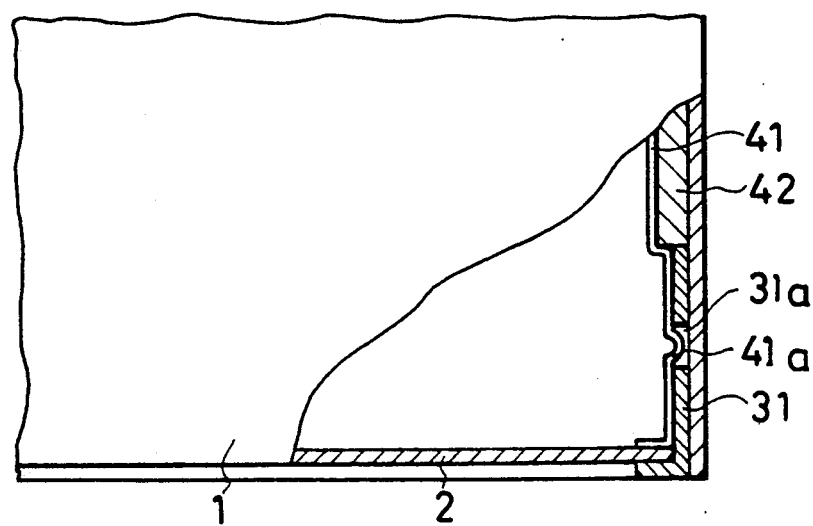
Figure 6:
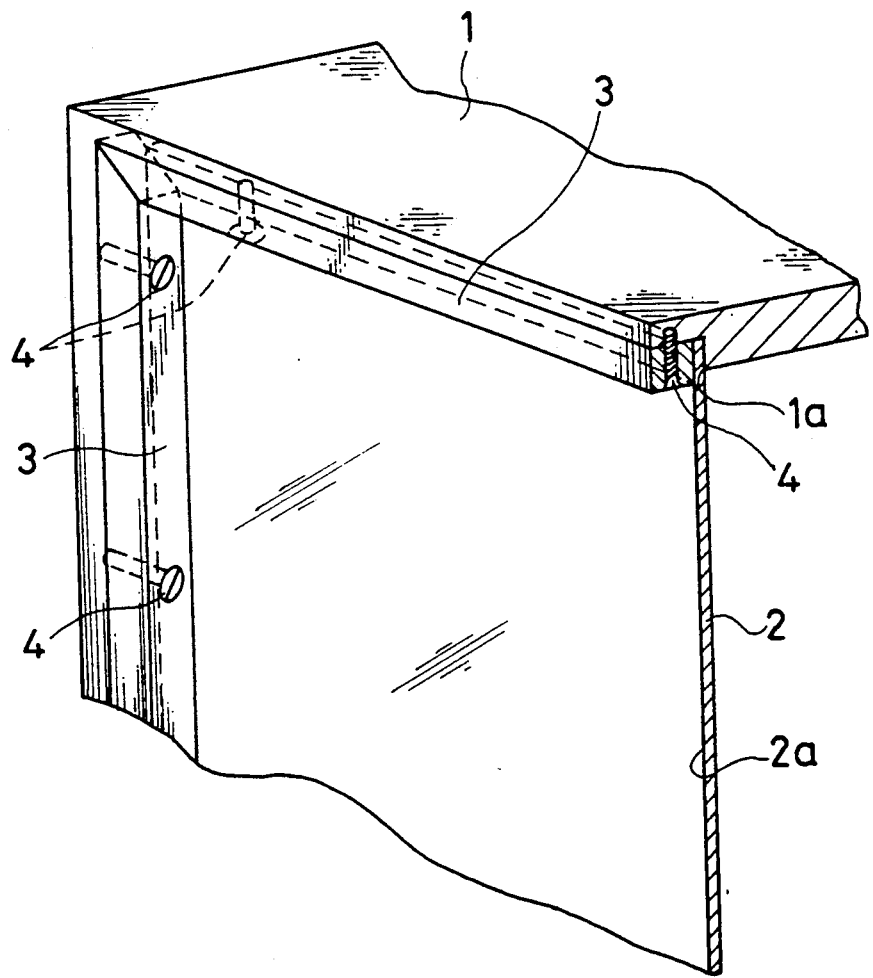
FIG. 6 is the perspective view showing the partial constitution of the conventional projection-type television set.
Figure 7:
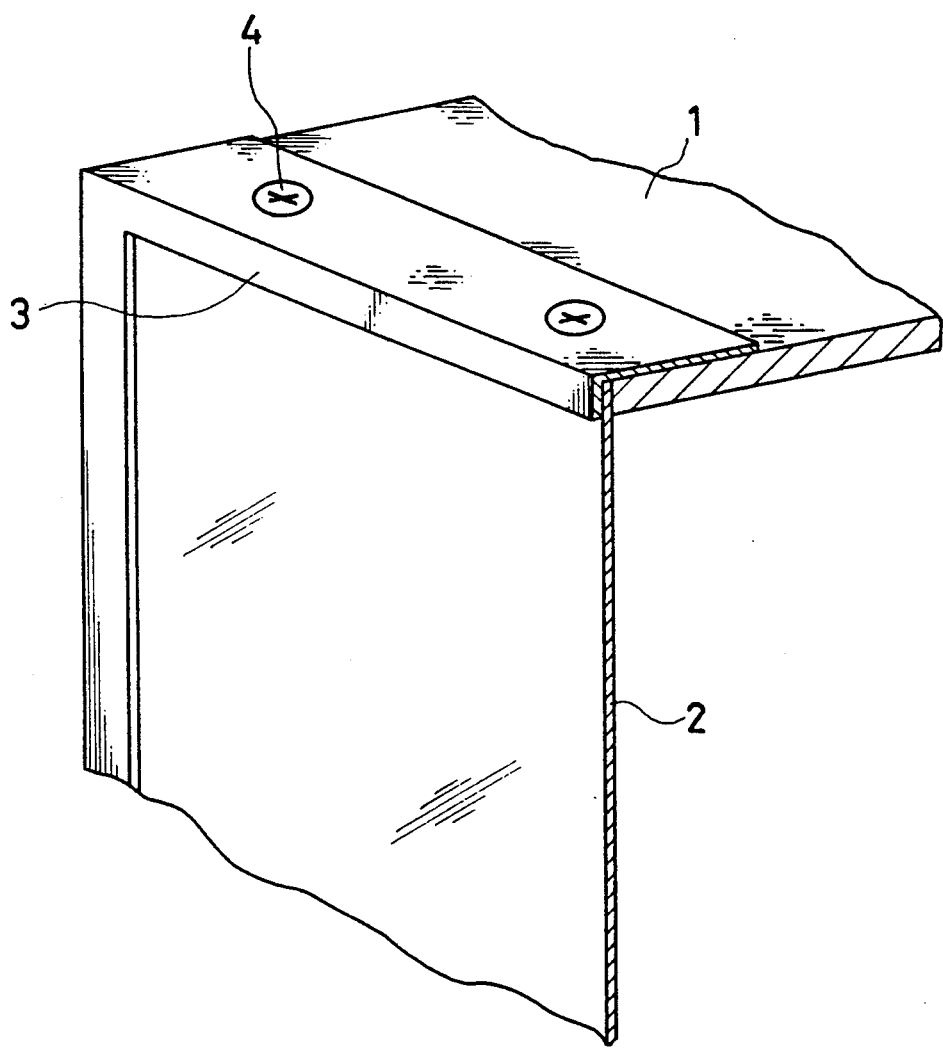
FIG. 7 is the perspective view showing the partial constitution of another conventional projection-type television set.

Another preferred embodiment of a projection-type television set in accordance with the present invention is described referring to FIGS. 5(a) and 5(b). FIGS. 5(a) and 5(b) are respectively showing partially sectional plan view of another preferred embodiment of the projection-type television set in accordance with the present invention. Elements having the same number as that of the above-mentioned embodiment are substantially the same, so that detailed explanations of the elements are omitted.

In FIGS. 5(a) and 5(b), the second leaf spring 41 is fixed on the side wall 1c of the housing 1 via an spacer 42. The second leaf spring 41 has a protrusion 41a in the center part of the spring arm part thereof. On the other hand, the vertical frame 31 has a hole 31a to which the protrusion 41a of the second leaf spring 41 is fit as shown in FIG. 5(b). Therefore, the vertical frame 31 is firmly held between the side wall 1c of the housing 1 and the second leaf spring 41.

As mentioned above, in the projection-type television set in accordance with the present invention, the screen 2 is firmly mounted in the front part of the housing 1 by the engagement of the protrusions 30a of the horizontal frames 30 and the notches 40a of first leaf springs 40 without using any screw. And the vertical gaps between the side walls 1c of the housing 1 and the screen 2 are filled by the vertical frames 31. Thereby, undesirable vibration of the screen 2 and so on are not occur. Furthermore, the screen 2 is easily taken away from the housing 1 even when plurality of the projection-type television sets are piled up.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A projection-type television set comprising:
   a housing in which plurality of projection lenses and CRT displays are provided;
   a plurality of first leaf springs provided on each of a front part of a respective ceiling and a bottom of said housing, and each respectively having a notch;
   a plurality of second leaf springs provided on a front part of respective side walls of said housing;
   a screen provided in a front opening of said housing;
   a pair of horizontal frames respectively each having an offset part which is held between said ceiling or bottom of said housing and said first leaf springs, each having a plurality of protrusions which are fit in said notches of said first leaf springs and each horizontal frame having a groove in which a top end part or a bottom end part of said screen is movably fit; and
   a pair of vertical frames provided in gaps between said screen and said side walls of said housing and held between said second leaf springs and said side walls.

2. A projection-type television set in accordance with claim 1, wherein
   said second leaf springs each have a protrusion in the center part of a spring arm part thereof; and
   said vertical frames each have at least one hole to which each said protrusion of said second leaf springs is fit.

* * * * *